United States Patent
Koju et al.

(10) Patent No.: US 9,032,190 B2
(45) Date of Patent: May 12, 2015

(54) RECOVERING FROM AN ERROR IN A FAULT TOLERANT COMPUTER SYSTEM

(75) Inventors: Toshihiko Koju, Kawasaki (JP); Takuya Nakaike, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 12/859,842

(22) Filed: Aug. 20, 2010

(65) Prior Publication Data

US 2011/0047364 A1 Feb. 24, 2011

(30) Foreign Application Priority Data

Aug. 24, 2009 (JP) ................................. 2009-193089

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 9/38 | (2006.01) |
| G06F 11/14 | (2006.01) |
| G06F 11/16 | (2006.01) |

(52) U.S. Cl.
CPC ............ *G06F 9/3834* (2013.01); *G06F 9/3842* (2013.01); *G06F 9/3851* (2013.01); *G06F 9/3861* (2013.01); *G06F 11/1407* (2013.01); *G06F 11/1479* (2013.01); *G06F 11/1497* (2013.01); *G06F 11/1695* (2013.01); *G06F 11/1629* (2013.01)

(58) Field of Classification Search
None
See application file for complete search history.

(56) References Cited

U.S. PATENT DOCUMENTS

| | | | | |
|---|---|---|---|---|
| 2001/0034824 | A1* | 10/2001 | Mukherjee et al. | 712/215 |
| 2008/0016393 | A1* | 1/2008 | Bose et al. | 714/8 |
| 2008/0244354 | A1* | 10/2008 | Wu et al. | 714/755 |

FOREIGN PATENT DOCUMENTS

| | | | |
|---|---|---|---|
| JP | 55-125598 | A | 9/1980 |
| JP | 57-051514 | | 3/1982 |
| JP | 2287858 | A | 11/1990 |
| JP | 03-269745 | A | 12/1991 |
| JP | 05-112508 | | 5/1993 |
| JP | 09069082 | A | 3/1997 |

(Continued)

OTHER PUBLICATIONS

Gomaa et al. (Transient Fault Recovery for Chip Multiprocessors, Jun. 2003, pp. 98-109).*

(Continued)

*Primary Examiner* — George Giroux
(74) *Attorney, Agent, or Firm* — Stephen R. Tkacs; Stephen J. Walder, Jr.; Jennifer R. Davis (57) ABSTRACT

A leading thread and a trailing thread are executed in parallel. Assuming that no transient fault occurs in each section, a system is speculatively executed in the section, with the leading thread and the trailing thread preferably being assigned to two different cores. At this time, the leading thread and the trailing thread are simultaneously executed, performing a buffering operation on a thread local area without performing a write operation on a shared memory. When the respective execution results of the two threads match each other, the content buffered to the thread local area is committed and written to the shared memory. When the respective execution results of the two threads do not match each other, the leading thread and the trailing thread are rolled back to a preceding commit point and re-executed.

18 Claims, 3 Drawing Sheets

(56) References Cited

FOREIGN PATENT DOCUMENTS

| JP | 09251393 A | 9/1997 |
| --- | --- | --- |
| JP | 10187616 A | 7/1998 |
| JP | 10214199 A | 8/1998 |
| JP | 10269095 A | 10/1998 |
| JP | 11039178 A | 2/1999 |
| JP | 11-085544 A | 3/1999 |
| JP | 2003-029986 A | 1/2003 |
| JP | 2005529383 A | 9/2005 |
| JP | 2008-102748 A | 5/2008 |

OTHER PUBLICATIONS

Reis et al (SWIFT: Software Implemented Fault Tolerance, Published 2005, pp. 1-12).*

Wang, Cheng et al., "Compiler-Managed Software-based Redundant Multi-Threading for Transient Fault Detection", Proceedings of the International Symposium on Code Generation and Optimization (CGO'07), 2007, pp. 244-258.

* cited by examiner

//RECOVERING FROM AN ERROR IN A FAULT TOLERANT COMPUTER SYSTEM

BACKGROUND

The present invention relates to a system, a method, and a program for recovering from an error occurring due to the influence of, for example, cosmic rays in a computer system.

In computer systems, a fault called a transient fault is known. A transient fault is a malfunction of a circuit that temporarily occurs due to the influence of, for example, cosmic rays. As the packing density of transistors is improved, the probability of occurrence of a transient fault increases. Thus, a processor is also required to include a mechanism for detecting and recovering from a transient fault. Especially, in computer systems used for a mission-critical purpose and computer systems exposed to a high level of cosmic rays, such as an aircraft or spacecraft control system, such a requirement is high.

In this regard, Japanese Unexamined Patent Application Publication No. 55-125598 discloses a technique for, in a redundant system in which the same program is caused to run on two processors, when one of the processors has detected an error in the processor's main memory, performing a recovery operation by reading a correct value from the other processor's main memory.

Moreover, Japanese Unexamined Patent Application Publication No. 3-269745 discloses a technique for, in a system in which two processors are put in an operating state and a wait state, and the respective contents of main memories of the processors are always equalized with each other by memory equlizing means, when memory diagnosis means of one of the processors has detected an error in the processor's main memory, performing a recovery operation by reading a correct value from the other processor's main memory.

However, in these known techniques, since the respective calculation results of the processors are not compared while a program is running, a transient fault having occurred in the processors cannot be detected, and thus recovery from the transient fault cannot be made.

On the other hand, Cheng Wang, Ho-seop Kim, Youfeng Wu, and Victor Ying, "Compiler-Managed Software-based Redundant Multi-Threading for Transient Fault Detection", In the Proceedings of the International Symposium on Code Generation and Optimization, pp. 244-258 (2007) discloses a mechanism for detecting a transient fault in a manner described below. In this mechanism, a source code is compiled into two versions, and the two versions are executed in respective CPU cores. For convenience sake, the threads are called a leading thread and a trailing thread. A leading thread and a trailing thread redundantly perform the same calculation and detect a transient fault by performing comparison when performing a read operation and a write operation on a shared memory. However, in this method, even when a transient fault is detected, recovery from the transient fault cannot be made. This is because, even when a mismatch between the calculation results is detected, no means for restoring a former state in which the calculations have not been performed exists, and thus a program is forcibly terminated in the current state.

SUMMARY

According to an illustrative embodiment, a program is first partitioned into sections at an unrecoverable point, for example, a system call, and a thread synchronization point existing in an original program to be executed. This processing is performed by a compiler. In a program in which appropriate synchronization is performed by partitioning the program at a thread synchronization point, unless a transient fault occurs, it is ensured that the same execution result is obtained from two threads. Hereinafter, for convenience sake, an unrecoverable point, a thread synchronization point, or the like is called a commit point.

Moreover, the respective codes of a leading thread and a trailing thread are preferably generated by a compiler on the basis of an original program to be executed.

The leading thread and the trailing thread are executed by an operating system in parallel. Assuming that no transient fault occurs in each section, a system of the present invention is speculatively executed in the section, with the leading thread and the trailing thread preferably being assigned to two different cores. At this time, the leading thread and the trailing thread are simultaneously executed, performing a buffering operation on a thread local area without performing a write operation on a shared memory. When the respective execution results of the two threads match each other, the content buffered to the thread local area is committed and written to the shared memory.

When the respective execution results of the two threads do not match each other, the process is rolled back to the beginning of the section, and the process is restarted from the beginning of the section.

In this case, the re-execution is preferably performed while performing synchronization between different cores for each memory access to reduce frequent re-execution due to a data race.

DETAILED DESCRIPTION

An embodiment of the present invention will now be described on the basis of the drawings. The same reference numbers denote the same components throughout the drawings unless otherwise specified. It should be understood that what is described below is just an embodiment of the present invention, and there is no intention of limiting the present invention to content described in the embodiment.

Figure 1:
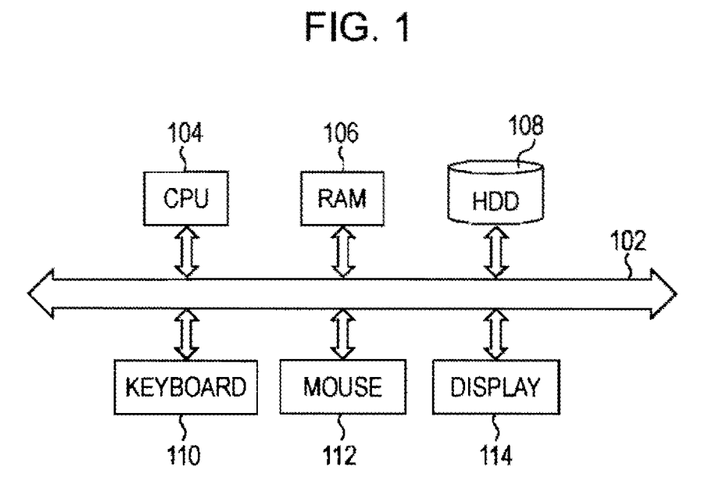
FIG. 1 is a block diagram of a hardware configuration for carrying out aspects of the illustrative embodiments.

Referring to FIG. 1, a block diagram of computer hardware for implementing a system configuration and processing according to an illustrative embodiment is shown. In FIG. 1, a CPU 104, a main memory (RAM) 106, a hard disk drive (HDD) 108, a keyboard 110, a mouse 112, and a display 114 are connected to a system bus 102. The CPU 104 may be a multi-core CPU based on the 32-bit or 64-bit architecture, for example. For instance, CPU 104 may be, but is not limited to, an Intel® Core™2 Duo processor or Intel® Core™2 Quad processor of Intel Corporation or AMD Turion™ processor can be used as the CPU 104. The main memory 106 may have a capacity of 2 GB or more. The hard disk drive 108 may have a capacity of, for example, 320 GB or more.

Although not shown, an operating system is stored in the hard disk drive 108 in advance. The operating system may be any one suitable for the CPU 104, such as Linux® operating system, Windows Vista® operating system, Windows XP operating system, or Windows 2000 operating system of Microsoft Corporation, or Mac OS® operating system of Apple Computer. "Linux" is a trademark of Linus Torvalds in the United States, other countries, or both. "Windows" is a trademark of Microsoft Corporation in the United States, other countries, or both. "Mac OS" is a trademark of Apple Inc. in the United States, other countries, or both.

Moreover, a program language processing system such as C, C++, C#, and the Java™ programming language is stored in the hard disk drive 108, as necessary. "Java" is a trademark of Sun Microsystems, Inc. in the United States, other countries, or both.

Furthermore, a development environment such as a text editor for writing a source code to be compiled in a program language processing system or the Eclipse™ platform may be stored in the hard disk drive 108. "Eclipse" is a trademark of Eclipse Foundation, Inc. in the United States, other countries, or both.

The keyboard 110 and the mouse 112 are used to start the operating system or a program (not shown) that is loaded into the main memory 106 from the hard disk drive 108 and that is then displayed on the display 114, or are used to input letters.

The display 114 is preferably a liquid crystal display, and one with any resolution such as XGA (a resolution of 1024*768) or UXGA (a resolution of 1600*1200) may be used.

Figure 2:
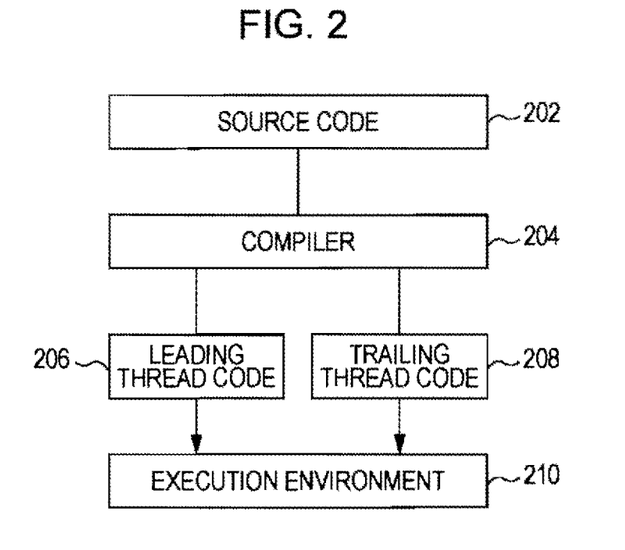
FIG. 2 is a functional block diagram of a mechanism for preparing processing modules in accordance with the illustrative embodiments.

FIG. 2 is a functional block diagram for preparing processing modules in accordance with an illustrative embodiment. In FIG. 2, a source code 202 may be a text file written in Java™ programming language in this embodiment and may be stored in the hard disk drive 108.

A compiler 204 may be a Java™ compiler. The compiler 204 may be stored in the hard disk drive 108 and loaded into the main memory 106 to compile the source code 202 and generate an executable code by the operation of the operating system in response to operations of the keyboard 110 and the mouse 112.

Especially, in the illustrative embodiment, the compiler 204 has a function of generating a leading thread code 206 and a trailing thread code 208 for performing processing substantially equivalent to that described in the source code 202 on the basis of the source code 202.

The leading thread code 206 and the trailing thread code 208 are different from the processing described in the original source code 202 in that a code for writing out data from a buffer and a code for performing comparison of the written data are inserted before a commit point in each of the leading thread code 206 and the trailing thread code 208. Except this point, the leading thread code 206 and the trailing thread code 208 are substantially the same as the processing described in the original source code 202.

Here, a commit point is the position of, for example, thread synchronization (for example, acquisition or release of a lock), a system call, or a call for an external library function in an original source code.

Especially, in the embodiment, an interval between a commit point and the next commit point is called a section.

The leading thread code 206 and the trailing thread code 208 prepared in this manner may be temporarily stored in the hard disk drive 108 and executed in an execution environment 210 prepared in the operating system when a program is executed. Specifically, the leading thread code 206 and the trailing thread code 208 may be assigned to individual cores of the CPU 104 and executed. In this sense, the CPU 104 may be a multi-core CPU, and it should be understood that the illustrative embodiment is also applicable to a single-core CPU. In the case of a single-core CPU, the CPU executes the leading thread code 206 and the trailing thread code 208 in parallel by the operation of the operating system, using the function of a task switch.

Figure 3:
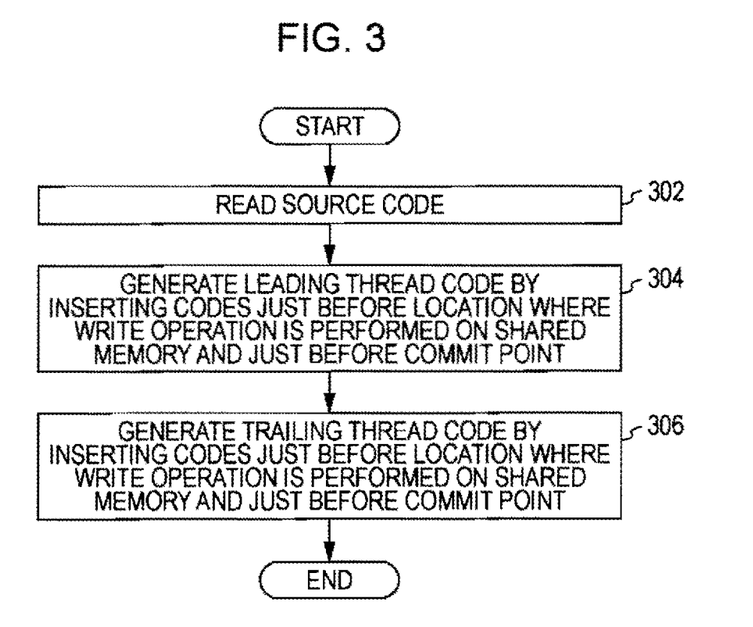
FIG. 3 is a flowchart of the process of generating a leading thread and a trailing thread in accordance with an illustrative embodiment.

FIG. 3 is a flowchart showing the outline of functions of the compiler 204 in accordance with an illustrative embodiment. In step 302 in FIG. 3, the compiler 204 reads and processes the source code 202. This operation is similar to ordinary compiling. Operations specific to the illustrative embodiment are generation of the leading thread code 206 by the compiler 204 in step 304 by inserting codes just before a location where a write operation is performed on a shared memory and just before a commit point and generation of the trailing thread code 208 by the compiler 204 in step 306 by inserting codes just before a location where a write operation is performed on a shared memory and just before a commit point.

This will next be described from another viewpoint. It is first assumed that an original source code is one described below. It should be understood that the code is based on the Java™ programming language but is a pseudo code that is not limited to a code of a specific programming language:

```
// original code
lock( );
compute val1;
p1 = val1;
compute val2;
s1 = val2;
unlock( );
// ---------------
``` where lock( ) is acquisition of a lock in the context of, for example, the Java™ programming language, and unlock( ) is release of a lock in the context of the Java™ programming language. lock( ) and unlock( ) correspond to commit points.

In the code described above, for example, compute val1 is a pseudo code formally describing an operation of calculating val1.

The compiler 204 generates the following leading thread code from such an original code:

```
// leading thread code
lock( );
backup(p1);
compute val1
p1 = val1;
compute val2;
buffer(s1, val2);
if (compare_buffer_and_private_data( ) /*
synchronization with trailing thread */ ==
FALSE) {
restore(p1);
reset_buffer( );
goto retry_with_synch;
}
commit_buffer( );
unlock( );
// ---------------
```

In this code, backup(p1) is an operation of backing up the value of private data p1.

The expression p1=val1 is writing the private data in the thread.

The expression buffer(s1, val2) means an operation of copying or buffering the value of val2 to a variable s1 in a thread local memory area.

The expression compare_buffer_and_private_data( ) represents an operation of comparing the value buffered by the leading thread and the value of the private data in the leading thread respectively with a value buffered by a trailing thread and the value of private data in the trailing thread. When the value buffered by the leading thread matches the value buffered by the trailing thread and when the value of the private data in the leading thread matches the value of the private data in the trailing thread, compare_buffer_and_private_data( ) returns TRUE. Otherwise, compare_buffer_and_private_data( ) returns FALSE.

The expression restore(p1) is an operation of restoring the value of p1.

The expression reset_buffer( ) is an operation of flushing the buffer.

The expression goto retry_with_synch returns the process to a rollback point that is typically a section boundary in a program.

As is shown, when the result of compare_buffer_and_private_data( ) is FALSE, restore(p1), reset_buffer( ) and goto retry_with_synch are executed. Especially, a rollback is completed by goto retry_with_synch.

On the other hand, when the result of compare_buffer_and_private_data( ) is TRUE, i.e., when the value buffered by the leading thread matches the value buffered by the trailing thread and when the value of the private data in the leading thread matches the value of the private data in the trailing thread, the process proceeds to the following commit_buffer( ).

The expression commit_buffer( ) is a commit operation of actually writing the buffered value. That is, a pair of a write location and a value to be written is buffered to the write buffer. In this situation, a commit operation is an operation of actually writing the value to the buffered write location.

As is apparent from the foregoing description, a code inserted just before a location where a write operation is performed on a shared memory in the leading thread according to the embodiment of the present invention is as follows:

(1) a code for buffering the value of the execution result to the thread local memory area.

Moreover, codes inserted just before a commit point in the leading thread according to the illustrative embodiment are as follows:

(2) a code for comparing the execution result buffered to the leading thread with the execution result buffered to the trailing thread, (3) a code for performing a rollback to a preceding commit point when the execution results do not match each other, and (4) a code for committing the buffered execution result when the execution results match each other.

A leading thread or a trailing thread first checks a write buffer when reading shared data to, when the latest value of a data area to be read exists, read that value, and when the latest value of the data area to be read does not exist, read data from a shared data area.

On the other hand, the trailing thread code to be generated is as follows and is the same as the leading thread code except that the trailing thread code does not include lock( ), commit_buffer( ), and unlock( ):

```
// trailing thread code
backup(p1);
compute val1;
p1 = val1;
compute val2;
buffer(s1, val2);
```

```
if (compare_buffer_and_private_data( ) /*
synchronization with leading thread */ ==
FALSE) {
restore(p1);
reset_buffer( );
goto retry_with_synch;
}
// -----------------
```

A process executed by the leading thread code and the trailing thread code prepared as described above will next be described with reference to a flowchart in FIG. 4.

Figure 4:
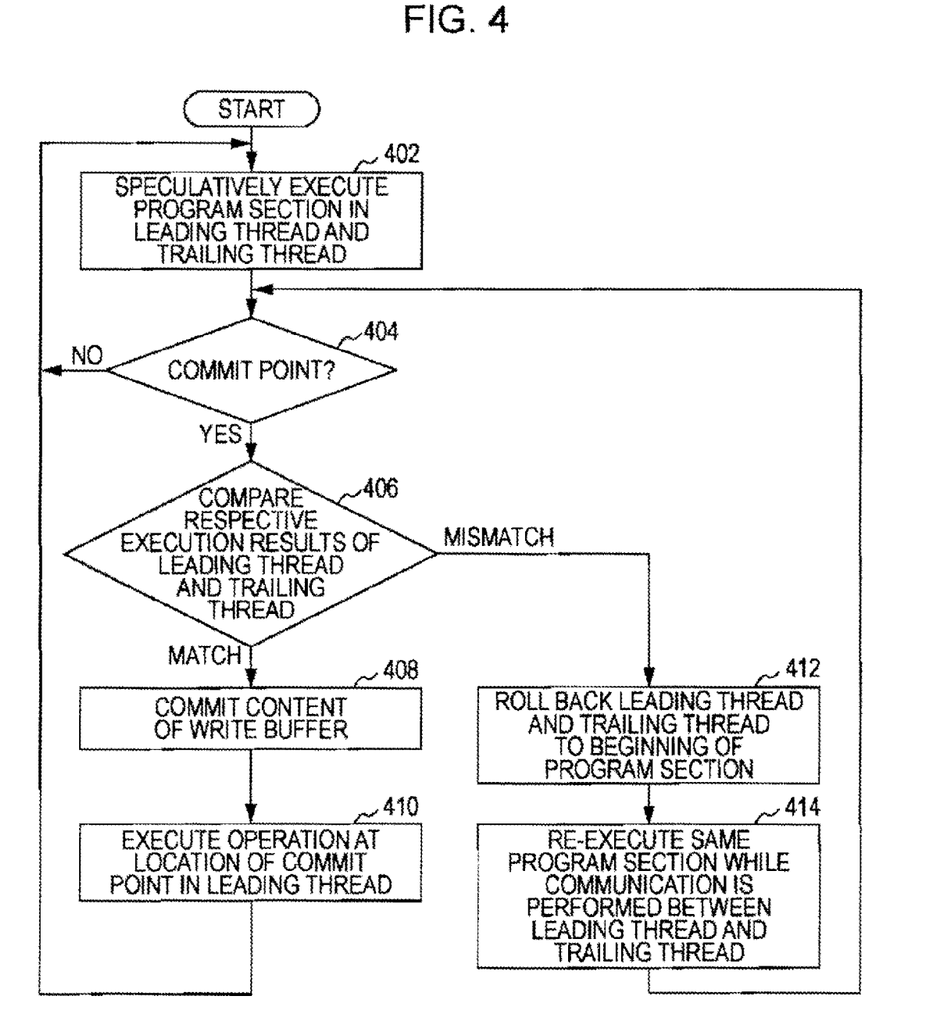
FIG. 4 is a flowchart of the process of comparing execution results between a leading thread and a trailing thread in accordance with an illustrative embodiment.

In step 402 in FIG. 4, the leading thread code and the trailing thread code are first speculatively executed. Here, "EXECUTE PROGRAM SECTION" assumes execution for each section in the context of step 402.

Then, in step 404, it is determined whether the leading thread code and the trailing thread code have reached a commit point. When the leading thread code and the trailing thread code have not reached a commit point, the process returns to step 402, and processing in the section in the leading thread code and the trailing thread code continues. In each of the leading thread code and the trailing thread code, the same calculation "compute val2" is performed, and buffer(s1, val2) separately buffers the result of the same calculation, as described above.

When it is determined in step 404 that the leading thread code and the trailing thread code have reached a commit point, in step 406, the respective execution results of the leading thread code and the trailing thread code are compared with each other. In the aforementioned code, this operation corresponds to the operation of compare_buffer_and_private_data( ) in both the leading thread code and the trailing thread code.

At this time, when any error such as a transient fault or a data race has not occurred, the execution results should match each other because the same operations have been performed in the leading thread code and the trailing thread code.

Here, a data race is data contention that occurs because the leading thread and the trailing thread independently read shared data. For example, in a case where, after the leading thread reads shared data, before the trailing thread reads the shared data, another thread updates the same shared data, a data race occurs. However, in the embodiment, in a program in which appropriate synchronization is performed by logically delimiting sections at a thread synchronization point, while the leading thread and the trailing thread perform a certain operation, another thread is prohibited from executing a section subject to contention. This substantially decreases the probability of occurrence of a mismatch between the execution results due to a data race.

When it is determined that the execution results actually match each other, the process proceeds to step 408 where the content of the write buffer is committed. This operation is an operation shown as commit_buffer( ) More specifically, at this point, the content of a backup of the private data is abandoned, and the value of the write buffer is written to the memory area of the shared data. Then, the content of the write buffer is initialized.

In step 410, the leading thread executes an operation at the location of the commit point. Then, the process returns to step 402 where the process proceeds to that of the next section in the leading thread and the trailing thread.

Returning to step 406, as a result of comparing the respective execution results of the leading thread code and the trailing thread code with each other, when the execution results do not match each other, the process proceeds to step 412.

This operation is an operation shown as compare_buffer_and_private_data( ) in the foregoing pseudo code.

In step 412, an operation of rolling back the leading thread and the trailing thread to the beginning of the program section is performed. This operation is an operation shown as restore (p1), reset_buffer( ) and goto retry_with_synch in the foregoing pseudo code. In more detail, when a rollback is performed, restoring of the backed-up private data and initialization of the write buffer are first performed. Then, the process is returned to the beginning of the section.

In this case, a data race may have occurred in the rolled-back section. Thus, in step 414, the following operation is executed.

The leading thread first reads the value of the shared data. Then, the leading thread sends the read data to the trailing thread through inter-thread communication.

The leading thread continues the execution, using the read content. On the other hand, the trailing thread continues the execution, using the sent content.

Then, when it is determined in step 404 that a commit point has been reached, in step 406, the respective execution results of the leading thread code and the trailing thread code are again compared with each other.

As a result, when the execution results match each other, in step 408, the content of the write buffer is committed, and in step 410, an operation at the location of the commit point is executed in the leading thread. Then, the process returns to step 402.

In this manner, until the execution result of the leading thread matches the execution result of the trailing thread, a rollback of the leading thread and the trailing thread is performed. Thus, even when a transient fault or a data race has occurred, this arrangement prevents an incorrect execution result from affecting the following operations.

Then, in step 402, when the leading thread has reached the end of the process, the leading thread indicates to the trailing thread to terminate. After the leading thread confirms termination of the trailing thread, the leading thread terminates.

While the present invention has been described, using the embodiment implemented on a personal computer, those skilled in the art will understand that the present invention is not limited to a specific computer architecture or configuration and can be also implemented in, for example, a workstation, a mainframe, and a system embedded in an aircraft or a spacecraft. Moreover, while an example of a multi-core processor has been described as the preferred embodiment, the present invention can be also embodied in a single-core processor.

Moreover, while the present invention has been described on a Java-base in the aforementioned embodiment, the present invention can be embodied in a combination of any operating system and any programming language processing system that enable multi threading. Other than the Java™ programming language, any programming language processing system known to those skilled in the art, for example, C, C++, C#, or the like, can be used.

The invention claimed is:

1. A computer system that is executed in a fault tolerant manner, the computer system comprising:
   a processor; and
   a memory coupled to the processor, wherein the memory comprises instructions which, when executed by the processor, cause the processor to:
   compile source code to form a leading thread and a trailing thread, wherein the leading thread and the trailing thread are substantially equivalent to the source code;
   identify a commit point code portion in the leading thread and the trailing thread, wherein the commit point code portion comprises a series of instructions that compute a private data value, compute a shared data value, and commit the shared data value to a shared memory;
   modify the leading thread and the trailing thread to insert a buffer instruction to buffer the shared data value in local memory;
   modify the leading thread and the trailing thread to insert a synchronization instruction to compare the buffered data value and the private data value in the local memory of the leading thread to the buffered data value and the private data value in the local memory of the trailing thread;
   modify the leading thread to insert a commit instruction to commit the buffered data value from the local memory of the leading thread to the shared memory responsive to the buffered data value and the private data value in the local memory of the leading thread matching the buffered data value and the private data value in the local memory of the trailing thread;
   modify the leading thread and the trailing thread to insert a rollback instruction to perform a rollback routine responsive to the buffered data value and the private data value in the local memory of the leading thread not matching the buffered data value and the private data value in the local memory of the trailing thread; and
   execute the leading thread and the trailing thread in parallel, wherein the leading thread and the trailing thread execute the buffer instruction to buffer the data value in local memory;
   wherein the leading thread and the trailing thread execute the synchronization instruction to compare the buffered data value and the private data value in the local memory of the leading thread to the buffered data value and the private data value in the local memory of the trailing thread;
   wherein the leading thread and the trailing thread perform the rollback responsive to a determination that the buffered data value and the private data value in the local memory of the leading thread do not match the buffered data value and the private data value in the local memory of the trailing thread; and
   wherein the leading thread and the trailing thread perform inter-thread communication for each memory access during re-execution of the commit point code portion responsive to the rollback being performed.

2. The computer system according to claim 1, wherein the processor is a multi-core processor, and the leading thread and the trailing thread are assigned to different cores of the processor.

3. The computer system according to claim 1, wherein the leading thread executes the commit instruction to write the buffered data value from the local memory of the leading thread to the shared memory responsive to a determination that the buffered data value in the local memory of the leading thread matches the buffered data value in the local memory of the trailing thread.

4. The computer system according to claim 1, wherein the commit point code portion comprises one of thread synchronization, a call for a system call, a library function existing outside, acquisition of a lock, or release of a lock.

5. The computer system according to claim 1, wherein the rollback is movement to a preceding commit point code portion.

6. A method for executing a computer system that includes a processor in a fault tolerant manner, the method comprising:
compiling source code to form a leading thread and a trailing thread, wherein the leading thread and the trailing thread are substantially equivalent to the source code;
identifying a commit point code portion in the leading thread and the trailing thread, wherein the commit point code portion comprises a series of instructions that compute a private data value, compute a shared data value, and commit the shared data value to a shared memory;
modifying the leading thread and the trailing thread to insert a buffer instruction to buffer the shared data value in local memory;
modifying the leading thread and the trailing thread to insert a synchronization instruction to compare the buffered data value and the private data value in the local memory of the leading thread to the buffered data value and the private data value in the local memory of the trailing thread;
modifying the leading thread to insert a commit instruction to commit the buffered data value from the local memory of the leading thread to the shared memory responsive to the buffered data value and the private data value in the local memory of the leading thread matching the buffered data value and the private data value in the local memory of the trailing thread;
modifying the leading thread and the trailing thread to insert a rollback instruction to perform a rollback routine responsive to the buffered data value and the private data value in the local memory of the leading thread not matching the buffered data value and the private data value in the local memory of the trailing thread;
executing the leading thread and the trailing thread on the processor in parallel, wherein the leading thread and the trailing thread execute the buffer instruction to buffer the data value in local memory;
the leading thread and the trailing thread executing the synchronization instruction to compare the buffered data value and the private data value in the local memory of the leading thread to the buffered data value and the private data value in the local memory of the trailing thread;
the leading thread and the trailing thread performing the rollback responsive to a determination that the buffered data value and the private data value in the local memory of the leading thread do not match the buffered data value and the private data value in the local memory of the trailing thread; and
the leading thread and the trailing thread performing inter-thread communication for each memory access during re-execution of the commit point code portion responsive to the rollback being performed.

7. The method according to claim 6, wherein the processor is a multi-core processor, and the leading thread and the trailing thread are assigned to different cores of the processor.

8. The method according to claim 6, wherein the leading thread executes the commit instruction to write the buffered data value from the local memory of the leading thread to the shared memory responsive to a determination that the buffered data value in the local memory of the leading thread matches the buffered data value in the local memory of the trailing thread.

9. The method according to claim 6, wherein the commit point code portion comprises one of thread synchronization, call for a system call, a library function existing outside, acquisition of a lock, or release of a lock.

10. The method according to claim 6, wherein the rollback is movement to a preceding commit point code portion.

11. The method according to claim 6, further comprising:
modifying the leading thread and the trailing thread to insert a backup instruction to backup a computed value, wherein the synchronization instruction compares the backed up computed value of the leading thread to the backed up computed value of the trailing thread; and
the leading thread and the trailing thread restoring the backed up computed value and performing a rollback responsive to a determination that the backed up computed value of the leading thread does not match the backed up computed value of the trailing thread or a determination that the buffered data value in the local memory of the leading thread does not match the buffered data value in the local memory of the trailing thread.

12. The method of claim 6, wherein the commit point code portion in the leading thread includes a lock instruction and an unlock instruction and wherein the commit point code portion in the trailing thread does not include the lock instruction, the unlock instruction, or the commit instruction.

13. A computer program product for executing on a computer system that includes a processor in a fault tolerant manner, the computer program product comprising a non-transitory computer readable medium having a computer readable program stored thereon, wherein the computer readable program, when executed on the computer system, causes the computer system to:
compile source code to form a leading thread and a trailing thread, wherein the leading thread and the trailing thread are substantially equivalent to the source code;
identify a commit point code portion in the leading thread and the trailing thread, wherein the commit point code portion comprises a series of instructions that compute a private data value, compute a shared data value, and commit the shared data value to a shared memory;
modify the leading thread and the trailing thread to insert a buffer instruction to buffer the shared data value in local memory;
modify the leading thread and the trailing thread to insert a synchronization instruction to compare the buffered data value and the private data value in the local memory of the leading thread to the buffered data value and the private data value in the local memory of the trailing thread;
modify the leading thread to insert a commit instruction to commit the buffered data value from the local memory of the leading thread to the shared memory responsive to the buffered data value and the private data value in the local memory of the leading thread matching the buffered data value and the private data value in the local memory of the trailing thread;
modify the leading thread and the trailing thread to insert a rollback instruction to perform a rollback routine responsive to the buffered data value and the private data value in the local memory of the leading thread not matching the buffered data value and the private data value in the local memory of the trailing thread; and
execute the leading thread and the trailing thread in parallel, wherein the leading thread and the trailing thread execute the buffer instruction to buffer the data value in local memory;

wherein the leading thread and the trailing thread execute the synchronization instruction to compare the buffered data value and the private data value in the local memory of the leading thread to the buffered data value and the private data value in the local memory of the trailing thread;

wherein the leading thread and the trailing thread perform the rollback responsive to a determination that the buffered data value and the private data value in the local memory of the leading thread do not match the buffered data value and the private data value in the local memory of the trailing thread; and wherein the leading thread and the trailing thread perform inter-thread communication for each memory access during re-execution of the commit point code portion responsive to the rollback being performed.

14. The computer program product according to claim 13, wherein the processor is a multi-core processor, and the leading thread and the trailing thread are assigned to different cores of the processor.

15. The program product according to claim 13, wherein the leading thread executes the commit instruction to write the buffered data value from the local memory of the leading thread to the shared memory responsive to a determination that the buffered data value in the local memory of the leading thread matches the buffered data value in the local memory of the trailing thread.

16. The program product according to claim 13, wherein the wherein the series of instructions compute a private data value, compute a shared data value, and commit the shared data value to the shared memory;

wherein the buffer instruction buffers the shared data value in the local memory;

wherein the synchronization instruction compares the buffered data value in the local memory and the private data value of the leading thread to the buffered data value in the local memory and the private data value of the trailing thread; and wherein the commit instruction commits the buffered data value from the local memory of the leading thread to the shared memory responsive to the buffered data value in the local memory and the private data value of the leading thread matching the buffered data value in the local memory and the private data value of the trailing thread.

17. The computer program product according to claim 13, wherein the commit point code portion comprises one of thread synchronization, a call for a system call, a library function existing outside, acquisition of a lock, or release of a lock.

18. The computer program product according to claim 13, wherein the rollback is movement to a preceding commit point code portion.

* * * * *